United States Patent
Makino et al.

(10) Patent No.: US 6,799,556 B1
(45) Date of Patent: Oct. 5, 2004

(54) IGNITION CONTROLLER FOR INTERNAL COMBUSTION ENGINE

(75) Inventors: Tomokazu Makino, Tokyo (JP); Shiro Yonezawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/694,169

(22) Filed: Oct. 28, 2003

(30) Foreign Application Priority Data

Apr. 21, 2003 (JP) .................................. P2003-115629

(51) Int. Cl.⁷ ................................................ F02P 5/00
(52) U.S. Cl. ............................ 123/406.24; 123/406.5
(58) Field of Search ...................... 123/406.24, 406.25, 123/406.5, 406.59, 406.11, 406.12, 406.35, 406.57, 406.58

(56) References Cited

U.S. PATENT DOCUMENTS

| | | | | |
|---|---|---|---|---|
| 5,699,771 A | * | 12/1997 | Tanabe | ........................ 123/479 |
| 5,871,002 A | * | 2/1999 | Nada | ........................... 123/609 |
| 5,957,107 A | * | 9/1999 | Kadota | ........................ 123/305 |
| 6,041,647 A | * | 3/2000 | Matsuoka | ..................... 73/116 |
| 6,223,722 B1 | * | 5/2001 | Shimizu et al. | ......... 123/406.18 |
| 6,575,150 B2 | * | 6/2003 | Katoh et al. | ................. 123/609 |
| 2002/0045984 A1 | | 4/2002 | Yonezawa et al. | |

FOREIGN PATENT DOCUMENTS

JP     1-227873 A     9/1989

* cited by examiner

*Primary Examiner*—John T. Kwon
(74) *Attorney, Agent, or Firm*—Sughrue Mion, PLLC (57) ABSTRACT

The ignition controller includes a crank angle sensor of an internal combustion engine, a cam sensor, and a control unit for controlling the ignition of each cylinder on the basis of a crank angle signal and a cam signal. Upon detecting a change in the engine speed of the internal combustion engine, the control unit has an ignition correcting unit for correcting the ignition energization start timing and the ignition timing in correspondence with that engine speed.

5 Claims, 8 Drawing Sheets

| STROKE | CRANK ANGLE PERIOD (ms) | CRANK ANGLE AVERAGE PERIOD | PERIODIC RATE OF CHANGE (%) | ENGINE SPEED (rpm) |
|---|---|---|---|---|
| 1 | 2.00 | 36.0 | 0.0 | 833 |
| 2 | 2.00 | 36.0 | 0.0 | 833 |
| 3 | 1.80 | 32.4 | 11.1 | 926 |
| 4 | 1.50 | 27.0 | 20.0 | 1111 |
| 5 | 1.15 | 20.7 | 30.4 | 1449 |
| 6 | 1.00 | 18.0 | 15.0 | 1667 |
| 7 | 0.95 | 17.1 | 5.3 | 1754 |
| 8 | 0.90 | 16.2 | 5.6 | 1852 |

IGNITION CONTROLLER FOR INTERNAL COMBUSTION ENGINE

BACKGROUND OF THE INVENTION

1. Field of the Invention

The present invention relates to a controller for effecting fuel and ignition control for each cylinder of an internal combustion engine mounted in, for example, a motor vehicle, and more particularly to an ignition controller for an internal combustion engine for making variable the ignition energization time in conjunction with fluctuations in the engine speed of an internal combustion engine.

2. Description of the Related Art

In an internal combustion engine of such as a vehicle-use engine, it is generally necessary to optimally control fuel injection and ignition timing for a plurality of cylinders in correspondence with the operating conditions. A so-called fuel ignition timing controller is known which is capable of ascertaining a reference crank angle signal for each cylinder by making use of the crank angle signal of the internal combustion engine and is capable of effecting ignition control on the basis of this signal as disclosed in JP-A-1-227873.

However, in the method of making variable the ignition energization timing in a case where the engine speed is changing, a first reference position signal is generated at a predetermined crank angle position, a second reference position signal is generated at another crank angle position, and an engine rotation period is determined from the first and second reference position signals. In a case where that period has dropped below a predetermined value is started at the first reference position, and the energization is completed at the second reference position. For this reason, although it has been possible to overcome the shortage of energization time in changes of rotation, particularly in the direction in which the number of revolutions rises, the energization time is therefore set to be long. Thus, a waste in electric power conventionally occurred.

In addition, the ignition energization is effected by a timer based on the first reference position signal in dependence on the aforementioned period. For this reason, in a case where the change of the engine speed is not a slow change, but the engine has been accelerated sharply, when the time of a timer value obtained from the first reference position has arrived, a time delay from a desired ignition crank angle can possibly occur. In a worst case, the ignition energization time can become too short.

The timing of ignition, i.e., the timing for sparking and detonating fuel, is the point of time when energization is completed. For this reason, conventional apparatuses were able to secure the ignition energization time, but not able to change the ignition timing. In addition, during a change in rotation, particularly during acceleration, the ignition timing occurs at a delayed angle. As a result, a shortage in the torque of the engine occurs, possibly leading to the deterioration of the sense of acceleration. Further, in the case where a reference interval is wide as with the first and second reference position signals, a time lag occurred in coping with a sudden change.

SUMMARY OF THE INVENTION

The present invention has been devised to overcome the above-described conventional problems, and an object of the invention is to provide an ignition controller for an internal combustion engine which appropriately secures the energization time for ignition after the ignition timing is set to a desired timing at the time of a change in the rotation of the internal combustion engine.

The ignition controller for an internal combustion engine in accordance with the invention includes: a crank angle sensor for generating a plurality of crank angle signals periodically in correspondence with a rotational angle of a crankshaft of an internal combustion engine; a cam sensor for generating cylinder discrimination information of the internal combustion engine in correspondence with a rotational angle of a camshaft rotating in synchronism with the crankshaft; and a control unit for controlling the ignition energization of each cylinder of the internal combustion engine on the basis of the crank angle signals and the cylinder information, wherein the control unit has an engine-speed detecting unit for detecting a change in an engine speed of the internal combustion engine and an ignition correcting unit for correcting ignition energization time, an ignition energization start timing, and an ignition timing in correspondence a changed engine speed in a case where the change in the engine speed is equal to a greater than a predetermined level.

The ignition controller for an internal combustion engine in accordance with the invention includes: the engine-speed detecting unit for detecting a change in the engine speed of the internal combustion engine on the basis of an average period of a crank angle and the ignition correcting unit for computing an ignition energization start on the basis of a change in the crank angle average period to correct the ignition energization time in a case where the change in the engine speed has been detected.

The ignition correcting unit of the ignition controller for an internal combustion engine in accordance with the invention effects correction on the basis of an ensuing estimated crank angle average period or effects correction by adding or subtracting a predetermined amount to or from a present crank angle average period.

The ignition correcting unit of the ignition controller for an internal combustion engine in accordance with the invention corrects again one of the once-corrected ignition energization start timing and ignition timing at the time of inputting of the crank angle signal prior to effecting that ignition control.

The ignition correcting unit of the ignition controller for an internal combustion engine in accordance with the invention synchronizes the corrected ignition energization start timing and ignition timing with a crank angle signal immediately close thereto.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

First Embodiment

Figure 1:
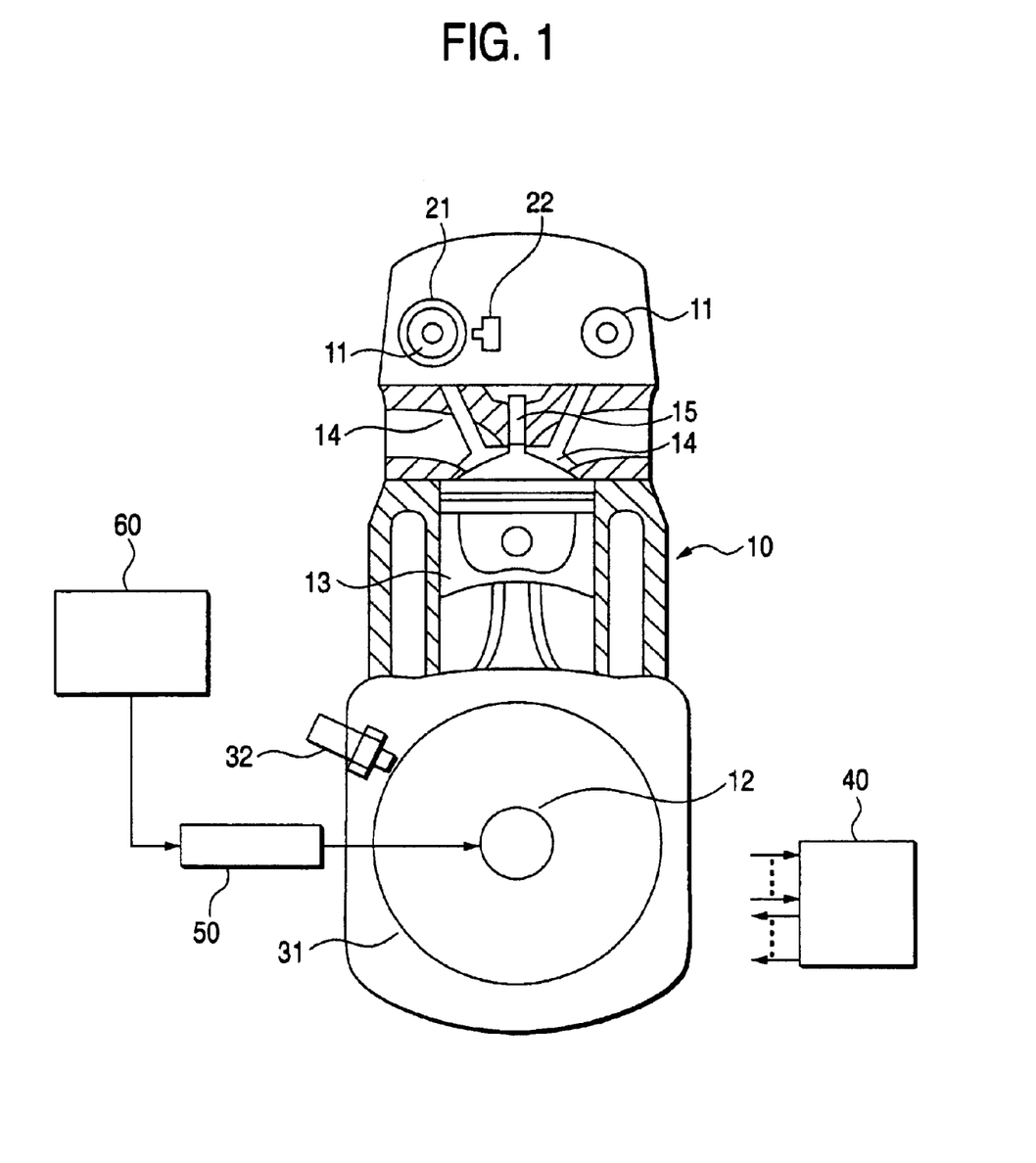
FIG. 1 is a system configuration diagram in accordance with first, second, and third embodiments of the invention.

Referring now to the drawings, a description will be given of a first embodiment of the invention. FIG. 1 is a diagram schematically illustrating principal portions in accordance with the first embodiment of the invention. An engine 10 making up an internal combustion engine is included of a piston 13 disposed movably in each cylinder to rotatively drive a pair of camshafts 11 and a crankshaft 12, a pair of valves 14 for effecting suction and exhaust with respect to each cylinder, and a spark plug 15 disposed in the combustion chamber.

When a starter 50 is turned on, at the time of starting the engine 10 the starter 50 is connected to the crankshaft 12, and is driven as electricity is fed from a vehicle-mounted battery 60, thereby effecting the cranking of the engine 10. An electronic control unit (ECU) 40 drives an unillustrated fuel injection valve, and after the injection of the fuel the ECU 40 outputs various drive signals for driving the spark plug 15 and burning the fuel. In addition, the ECU 40 fetches various input signals, and is a control unit for controlling the amount of fuel, the ignition timing, and the like on the basis of such information.

Figure 2:
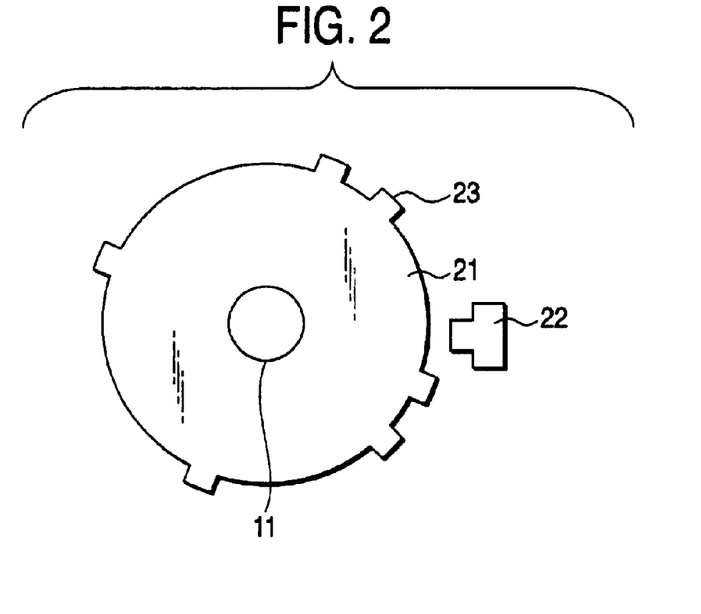
FIG. 2 is a diagram of a cam sensor in accordance with the first, second, and third embodiments.
Figure 3:
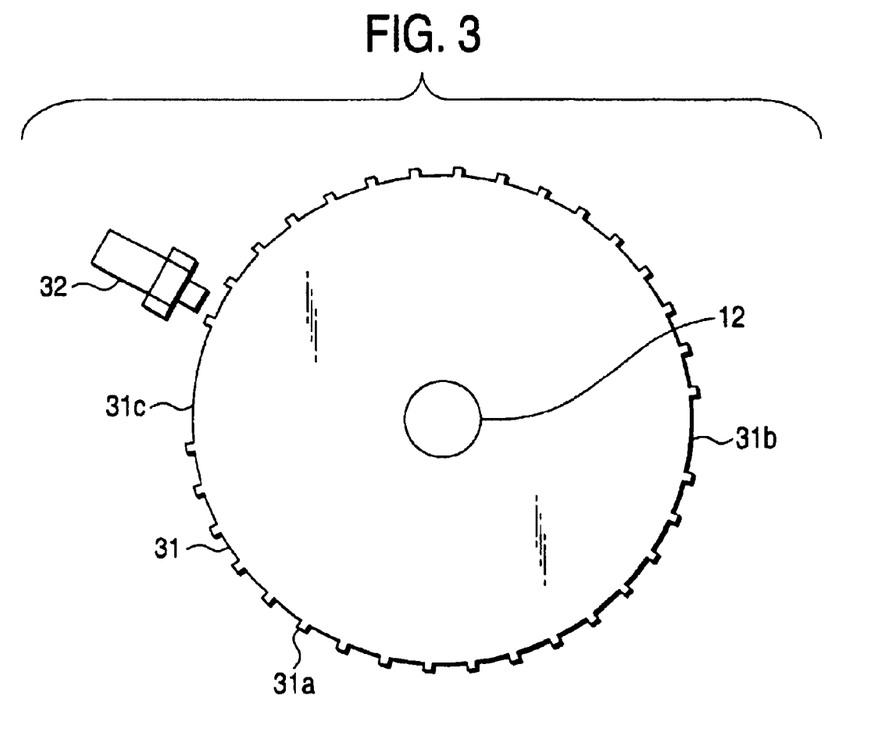
FIG. 3 is a diagram of a crank angle sensor in accordance with the first, second, and third embodiments.

FIG. 2 is a side elevational view specifically illustrating an outer peripheral shape of a signal plate 21 which is a cylinder-discrimination-signal generating unit. FIG. 3 is a side elevational view specifically illustrating an outer peripheral shape of a signal plate 31 which is a crank-angle-signal generating unit. In FIG. 2, asymmetrical projections or teeth 23 are provided along the outer periphery of the signal plate 21, and a sensor 22 detects these projections and generates signals. Here, the signal plate 21 and the sensor 22 will be collectively referred to as a cam sensor. In FIG. 3 as well, equally spaced projections 31a are provided along the outer periphery of the signal plate 31, but there are missing tooth portions as shown at 31b (one tooth is missing) and 31c (two teeth are missing). A sensor 32 detects these projections and generates signals. Similarly here, the signal plate 31 and the sensor 32 will be collectively referred to as the crank angle sensor.

In FIGS. 1 to 3, when the engine 10 rotates, the sensor 32 mounted in the vicinity of the crankshaft 12 generates a crank angle signal. Further, the sensor 22 mounted in the vicinity of the cam shaft 11 generates a cam signal. These signals are inputted to the ECU 40.

Figure 4:
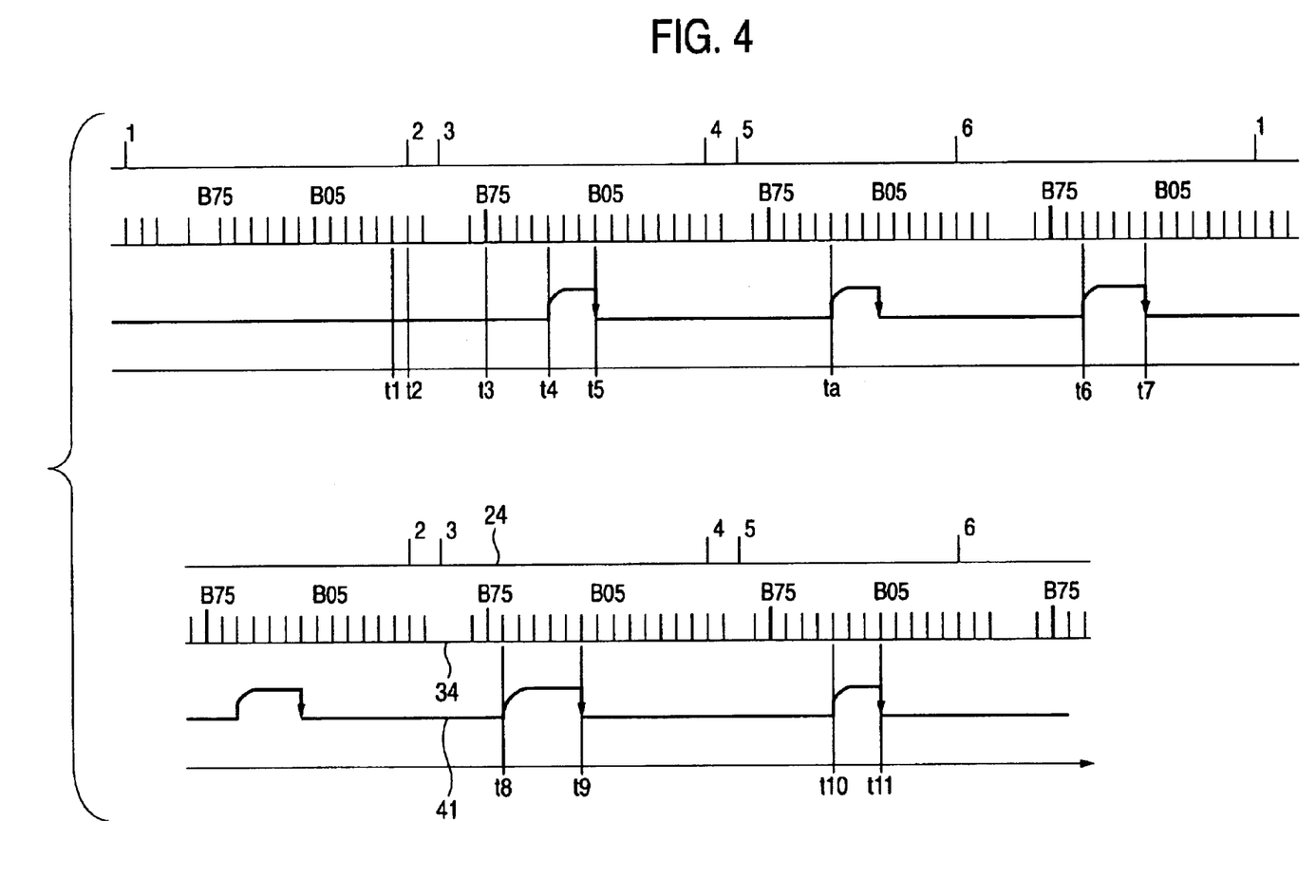
FIG. 4 is a timing chart in accordance with the first, second, and third embodiments.

Referring now to FIG. 4, a description will be given of cylinder discrimination and ignition control from a specific signal pattern of a four-cylinder engine based on the signals from both sensors 22 and 32. In the drawing, (24) denotes a cam sensor signal, (34) denotes a crank angle signal, and (41) denotes an ignition signal, these signals being shown in a time series.

The crank angle signal (34) is a signal for each 10 degrees, as shown in FIG. 3, and the section during which the four cylinders are controlled is (1 cycle=720° CA (crank angle)). In addition, missing teeth (31b and 31c in FIG. 3) are set for each 180° CA, and the signal is not generated by a one-tooth (200) portion at 31b, while the signal is not generated by a two-teeth (30°) portion at 31c. These constitute a basis of reference positions of the crank angle. Further, respective rear ends of these missing tooth portions are set as two reference positions. Upon detecting one set reference position (75° CA before TDC; hereafter referred to as B75° CA), the ECU 40 assumes a timing for starting the calculation of outputs (amount of fuel injection, ignition timing, etc.). The other set reference position is B05° CA, which represents an ignition timing in a predetermined state and substantially represents TDC.

As the method of detecting the missing teeth in the crank angle signal, the following method of period measurement is known, for example. Time intervals of the respective signals are measured (between t1 and t2 in FIG. 4), and these periods are set as Tn−2, Tn−1, and Tn. Here, n represents the present period, n−1 represents the period of one period before, and n−2 represents the period of two periods before.

$$K=(Tn-1)^2/\{(Tn-2)*Tn\}<2.25 \quad (1)$$

$$2.25 \leq K < 6.25 \quad (2)$$

$$K \geq 6.25 \quad (3)$$

It is determined that in the case where Formula (1) is valid, missing teeth are not present, that in the case where Formula (2) is valid, one tooth is missing, and that in the case where Formula (3) is valid, two teeth are missing.

On the other hand, the cam signal (24) is so arranged that one or two signals are generated until B75° CA. For this reason, it is possible to discriminate the cylinder on the basis of the number of cam signals detected and the number of missing teeth of the crank angle.

When the starter is turned on and the engine starts rotating, the moment (t3) it has been possible to detect B75° CA twice, it becomes possible to discriminate the cylinder through the combination of the cam number of the cam signal (24) and the number of missing teeth of the crank angle signal (34). As a result, fuel injection and ignition control becomes possible. An ignition signal can be outputted from a certain crank angle (t4), and ignition can be effected for the first time at t5 (B05° CA). Initial firing occurs at this timing. By the repetition of this process, the engine rotates, and normal engine control can be initiated.

When the engine is rotating at a substantially fixed engine speed, it suffices if control is continuously provided such that computing is started at a first reference angle of B75° CA, ignition energization is started at a predetermined crank angle, the ignition energization is stopped at, for example, B05° CA, and the injected fuel is detonated. However, there are cases where the engine speed changes abruptly according to the driver's intent to accelerate or decelerate. In particular, if misfire occurs even once after starting, the engine speed temporarily drops and subsequently recovers, but the engine speed changes greatly in the recovery. In addition, in the case of a gear shift shock as well, a drop in the engine speed and a subsequent sharp recovery occur.

Particularly in the case of an acceleration change, if an ignition energization period Tdms computed at the first reference angle of B75° CA corresponds to a section between B35° CA to B05° CA, ignition energization is effected during this section. However, since the vehicle is in a state of acceleration, energization is undesirably effected in a shorter time than expected to have been executed in the crank angle correspondence. In a worst case, there is a possibility that sparking fails to occur due to a shortage in the ignition energization, i.e., misfire can occur. Further, as for B05° CA as well, by effecting spark advancing, ignition timing is changed to allow more appropriate torque to occur. At this time, under the assumption that the ignition period determined at B75° CA is at an equivalent engine speed, an ignition timing to arrive in the near future is temporarily determined. Energization is effected in advance for a necessary period from this ignition stop timing. Namely, an estimated ignition timing and an estimated ignition start timing are determined, and are corrected by conducting recalculation for each crank angle to make this estimation more accurate. The method of control for determining an appropriate ignition timing will be described below.

First, conceptually, in a case where a sudden change in the engine speed has occurred, in order to secure the energization time as at t6, t7, t8, and t9, the energization start crank angle B35° CA is started from B55° CA or B65° CA. In addition, in a case where spark-advance control is carried out, the energization stop timing is set slightly before B05° CA, e.g., B10° CA.

Figure 5A:
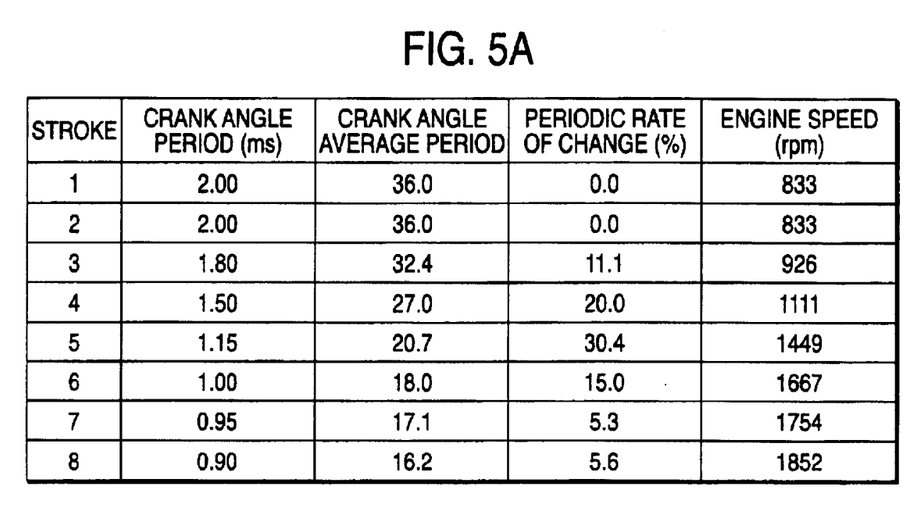
FIGS. 5A and 5B are diagrams illustrating fluctuations in the engine speed in accordance with the first, second, and third embodiments.
Figure 5B:
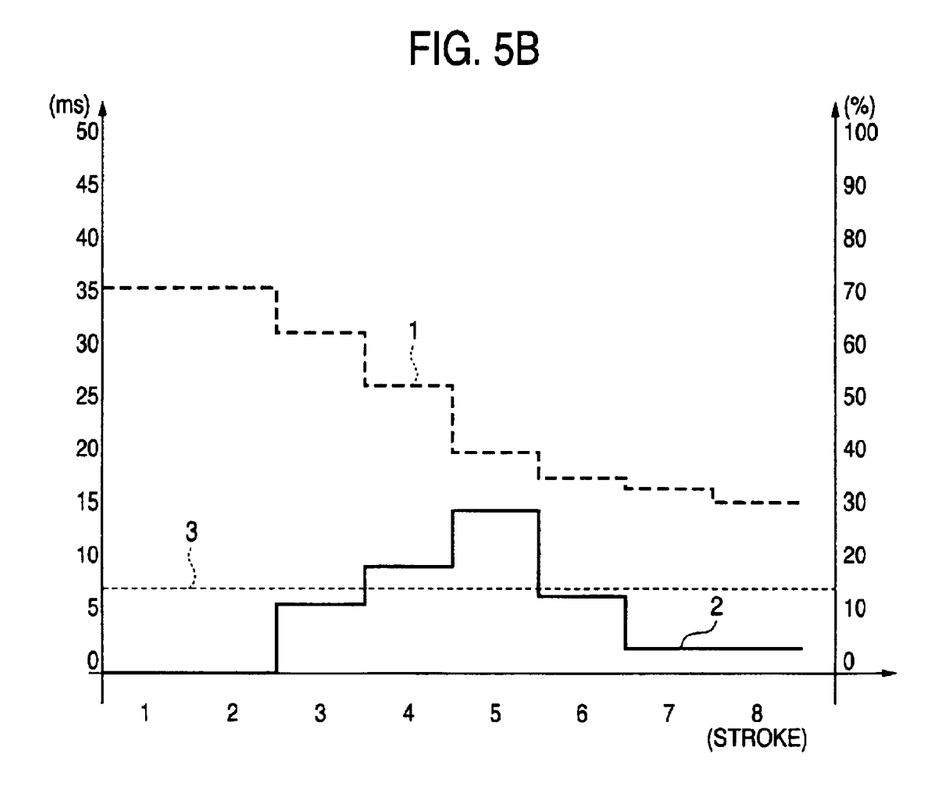

Next, a specific description will be given of the method of detecting a sudden change in the engine speed. By way of example, it is assumed that there occurred fluctuations in the engine speed such as those shown in FIGS. 5A and 5B. FIG. 5A shows fluctuations of the crank angle period for each stroke. It should be noted that the engine speed is the reciprocal of the crank angle period, and can be substituted by the crank angle period. Further, an average period of the crank angle is measured to determine a periodic rate of change. This periodic rate of change is used for determining a sudden change in the engine speed. FIG. 5B graphically shows these numerical values. In FIG. 5B, (1) indicates the crank angle average period, (2) indicates the periodic rate of change, and (3) is a line-indicating a threshold for determining a sudden change in the period. In cases where this line is exceeded, the ignition energization time is corrected. It can be appreciated from the graph in FIG. 5B that fourth and fifth strokes are subject to correction.

Next, the concrete method for obtaining the above values is explained a periodic rate of change L for each crank angle average period Tavn (it is assumed that n represents the present point of time, and that n−1 represents a previous one) is determined by the following formula:

$$L=|(1-\text{Tavn-1}/\text{Tavn})|*100 \quad (4)$$

If this L is at a predetermined value or more, it is determined that there has been a sudden change in the engine speed, and if less than the predetermined value, it is determined that normal processing is carried out. As the crank angle average period, the average of the 180° period for each B75° CA is utilized. This is because the engine speed at each crank angle of 10° becomes an instant engine speed, and the engine speed fluctuates between B70° CA and B05° CA due to the position of the piston. In other words, since the engine speed is high for the expansion stroke, and the engine speed is low for the compression stroke, the engine speed itself varies, and the variation is suppressed by making use of the average of the crank angle period of a predetermined period.

Next, a description will be given of the method of computing the energization time. If it is assumed that an energization start angle is θon, that a target ignition timing is θad, that a target energization time is Td, and that an ensuing estimated crank angle period is Tf, the energization start angle can be calculated from the following formula:

$$\theta on=\theta ad+(Td/Tf)\cdot *180 \quad (5)$$

$$\theta on=\theta ad+(Td/\text{Tavn})*180+\alpha \quad (6)$$

Here, θad is an explosion timing which is determined separately from the engine speed, the amount of intake, and the like. Td is the ignition energization time which is obtained from the supply voltage, the engine speed, and the like. Tf is an estimated value and is for estimating the average period from the latest crank angles or for adjusting the previous crank angle period. However, since this is strictly an estimation, the previous crank angle period may be used as in Formula (6), and a correction term may be added instead. According to this concept, α is an addition term for the time of a sudden change in the period, and is set to a predetermined value of, for example, 20° CA. The value of α is such a corresponding crank angle that a minimum ignition energization time can be secured even if a sudden change has occurred at a predetermined engine speed or below. For this reason, this value of α may also be changed in dependence on the engine speed.

Next, a specific computation will be made by using the values of FIG. 5A. By using the crank angle average period for each B75° CA as the crank angle period, if the values of the third and fourth strokes, for example, are substituted into Formula (4), we have $$L=|(1-(36/32.4))|*100=11.1\%$$

$$L=|(1-(32.4/27))|*100=20.0\%$$

If it is assumed that a predetermined value of the sudden change in the period is 17.5%, it can be determined that the fourth stroke is subject to correction. Next, the energization start timings are calculated from Formulae (5) and (6).

3rd stroke: θon=10+(5/32.4)*180=37.8°

4th stroke: θon=10+(5/21)*180=52.90°

$$\theta on=10+(5/27.0)*180+20=63.40° \quad (6)$$

Here, it is assumed that a minimum of 4 ms or more must be secured as the energization time, the target normal energization time is set to 5 ms, or the target ignition timing is set to B10° CA. In addition, an average period derived from the latest crank angle periods is set as the ensuing estimated period. The above calculations show that, in the third stroke energization is started at B37.8° CA, in the fourth stroke energization is started at B52.90° CA from Formula (5) and at B63.4° CA from Formula (6). Meanwhile, since the third stroke is determined to be not a sudden change in the period, not the accurate angle determined above but a crank angle closest to this value, e.g., B45° CA, maybe set as the ignition energization start, and B10° CA may be set as the ignition timing. Here, the estimated crank angle period Tf in Formula (5) is calculated from the degree of change between the previous third stroke and the present fourth stroke in accordance with the following formula:

$$Tf = 27*(1 - L/100)$$
$$= 27*(1 - |1 - 32.4/27|) = 21$$

Here, since the crank angle period is undergoing a sudden change, high-order two digits are used in all these calculations, and the lower-order figures are omitted. These values are converted again into the energization time Dn in accordance with the following formula:

$$Dn=(\theta on-\theta ad)*Tn+1/10 \quad (7)$$

If the above-described ignition energization start angles in the third and fourth strokes are substituted into Formula (7), we have

| | |
|---|---|
| 3rd stroke | maximum Dn = (45 − 15) * 1.8/10 = 5.4 ms |
| | minimum Dn = (45 − 15) * 1.5/10 = 4.5 ms |
| 4th stroke | maximum Dn = (52.9 − 10) * 1.5/10 = 6.4 ms |
| | minimum Dn = (52.9 − 10) * 1.5/10 = 4.9 ms |
| (6) | maximum Dn = (63.4 − 10) * 1.5/10 = 8.0 ms |
| (6) | minimum Dn = (63.4 − 10) * 1.15/10 = 6.1 ms |

Here, the maximum energization time Dn is the energization time in a case where it is assumed that the present crank angle period continued even if the engine rotation is on an upward trend. On the other hand, the minimum energization time Dn is the energization time calculated on the basis of the instant crank angle period at B75° CA detected next time. As described above, the ignition energization time for each stroke changes due to the sudden change, and the ignition energization time becomes 5.4 ms at maximum and 4.5 ms at minimum in the third strokes, which is slightly shorter than the target. However, this is due to the fact that the period sudden change threshold is set to 17.5%, and even in the worst case of the ignition energization time, the ignition performance is not affected. For this reason, this threshold is determined by incorporating the environment of the internal combustion engine, particularly the supply voltage, the performance of the spark plug, a drop in the drive circuit, the temperature, and the like. The ignition energization time for the fourth stroke, which underwent a sudden change, is 4.9 ms at minimum, with the result that the energization time is secured.

On the other hand, a description will be given of the method in a case where the engine speed has suddenly dropped, i.e., the case of the sixth stroke in the example of FIGS. 5A and 5B. In this case, it suffices if the calculations are simply returned to normal calculations without correction.

$$\theta on=10+(5/18.0)*180=60°$$

$$\text{maximum } Dn=(60-10)/10*1.0=5.0 \text{ ms}$$

$$\text{minimum } Dn=(60-10)/10*0.95=4.75 \text{ ms}$$

The undesirable event of this sixth stroke can be overcome by starting the ignition at B60° CA and setting the target ignition at B10° CA. However, during such a sudden change of the engine, by anticipating a reacceleration, it is desirable to adopt a method of preventing erroneous detection by, for instance, returning the control to normal in a case where a plurality of nondetections of sudden change have continued, or by lowering the sudden change threshold (L).

Figure 6:
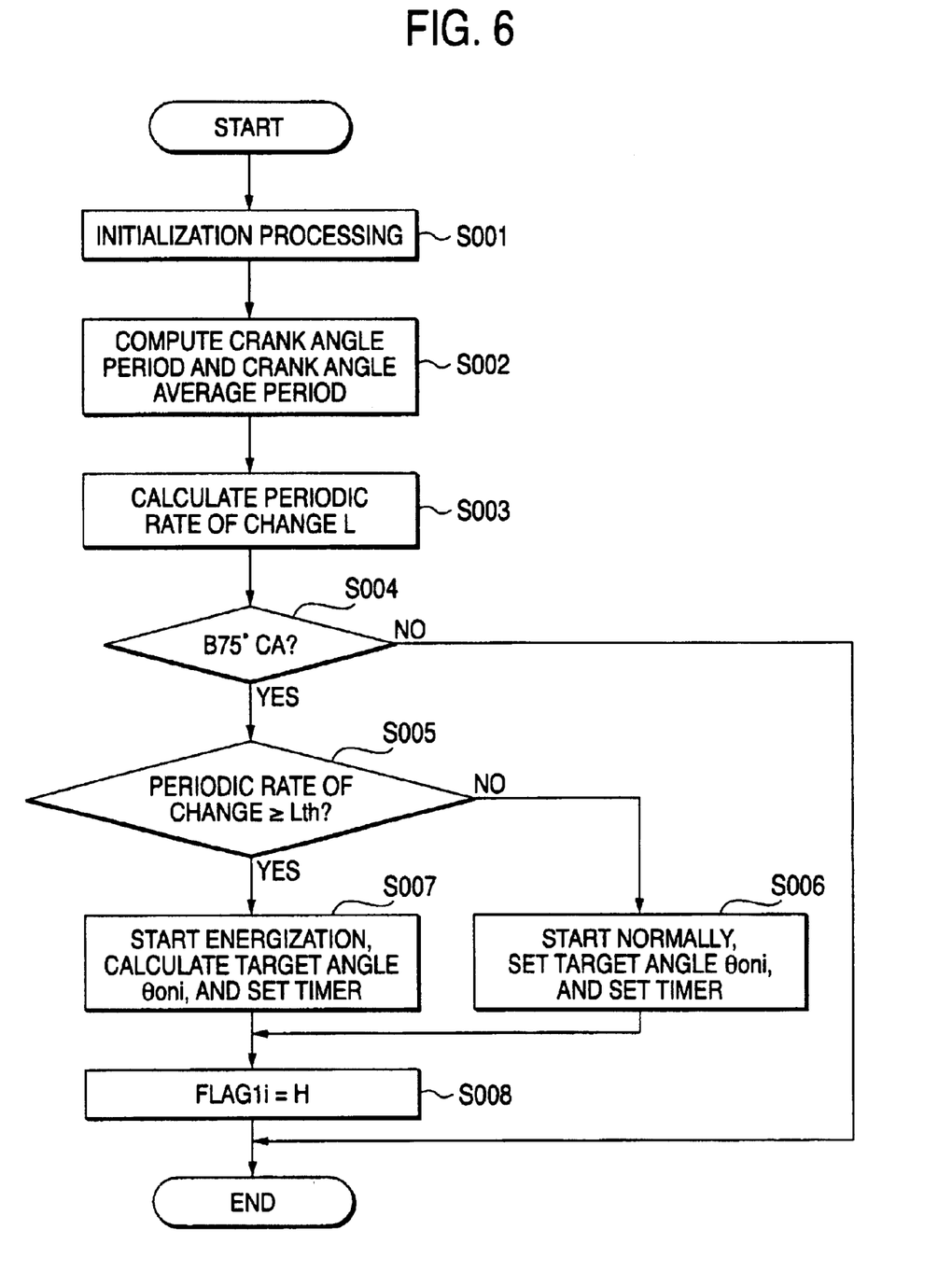
FIG. 6 is a basic flowchart in accordance with the first and second embodiments.

Next, a description will be given of actual processing in accordance with processing by the CPU in the ECU 40. FIG. 6 shows its flowchart. When power is supplied to the ECU 40, the CPU starts operation, and the RAM, outputs, and the like are initialized in Step S001. In Step S002, the crank angle period and the crank angle average period are computed. This method is easily obtained from the input time of the crank signal. Similarly, the crank angle average period is also obtained from the time intervals inputted at B75° CA.

In Step S003, the rate of change of the crank angle period is determined from Formula (4). In Step S004, a check is made as to whether or not the crank angle is presently at B75° CA. If not B75° CA (NO), the subsequent processing is not effected. This is because various settings for ignition control are provided at each B75° CA. Further, in addition to B75° CA, the discrimination of the present cylinder is also clarified from the cam sensor signal. In the case of B75° CA (YES), a check is made as to whether or not the periodic rate of change L of the crank angle determined in Step S003 is at the threshold (Lth) or more, i.e., whether or not there has been a sudden change in the engine rotation.

If less than the threshold (NO), a sudden change has not occurred, so that the normal energization start angle eon is set in Step S006. For example, a timer is set in correspondence with B45° CA. As for this timer, if the time at B75° CA is assumed to be t75, the estimated time at B45° CA and the stop time (B10° CA) in the example of the aforementioned third stroke become as follows:

$$(75-45)/10*1.8=5.4 \text{ ms}$$

$$(75-10)/10*1.8=11.7 \text{ ms}$$

Accordingly, the start time of t75+5.4 and the stop time of t75+11.7 are set on the timer. However, these settings of the timer do not correspond to the cylinder of present B75° CA, but corresponds to the cylinder at ensuing B75° CA. Namely, if a description is given with reference to FIG. 4, the timer values set at t3 are for ta which is the timing for ensuing ignition control. This is a measure against the situation where, during low-speed engine rotation, calculation can be made at t3 and control can be provided at t4, but there is no leeway in time if the time of high speed is taken into consideration. Hence, this ignition signal output must inevitably correspond to the ensuing cylinder.

On the other hand, if there has been a sudden change (YES), in Step S007, the energization start angle Eon is determined from Formula (5) or (6). In the same way as described above, the ignition start and stop times are set from eon. The suffix in Steps S006 and S007 is an identifier for discriminating the cylinder, and in the case of a four-cylinder vehicle, 1 to 4 are present as i. Accordingly, as for the energization start angle, after the subject cylinder is identified, θon is determined with respect to that cylinder. It should be noted that the subject cylinder has already been clarified in Step S004.

In Step S008, since the energization start angle has been computed, a flag indicating that an ignition signal can be correspondingly outputted is set. This flag is also provided with the cylinder identifier i. After the above-described processing, the operation returns to Step S002. This series of processing is consecutively effected in predetermined periods.

Figure 7:
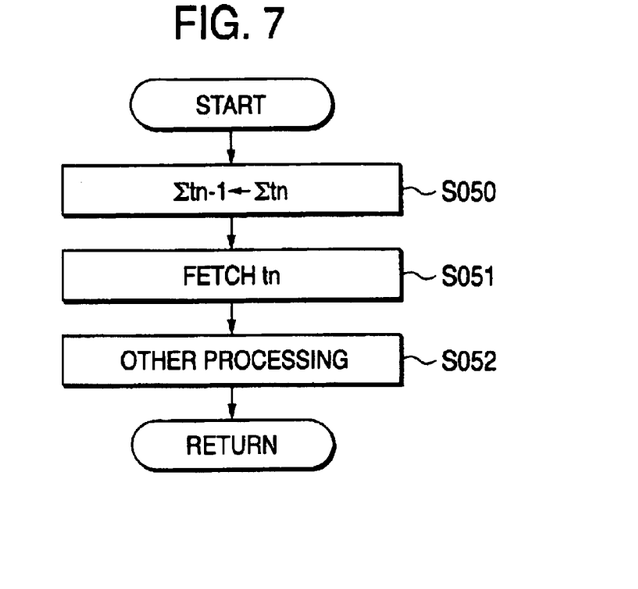
FIG. 7 is a flow chart in accordance with the first embodiment.
Figure 8:
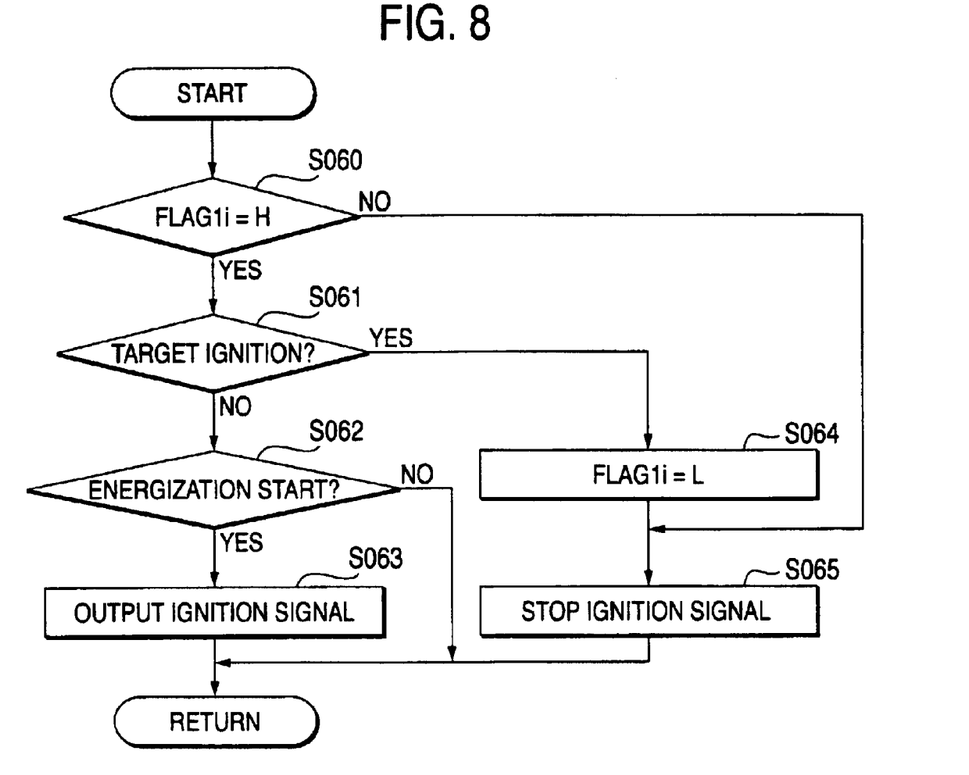
FIG. 8 is a flow chart in accordance with the first embodiment.

In addition, the CPU effects other processing shown in FIGS. 7 and 8. FIG. 7 shows crank angle interrupt processing, and this processing routine is executed for each 10° of the crank angle. Step S050 is processing in which crank angle data inputted until the previous occasion is inputted to the previous memory before last, and all the pieces to be stored are stored.

In Step S051, the time when the crank angle signal was inputted is stored. As a result, a plurality of crank angle input times are stored, and serve as data for determining the periods and their average period. In Step S052, other processing is carried out. For example, the recognition of the present crank angle position, cylinder identification based on cam sensor information, and the like are processed. This completes the interrupt routine, and the operation returns to the main routine in FIG. 6.

In addition, in FIG. 8, timer processing is effected for each predetermined timer. The ignition start and target time have been set on the timer, and upon arrival of this time, this routine processing is effected. In addition, in the case of the four-cylinder vehicle, it is necessary to make a check for each cylinder, and equivalent processing is effected four times. Here, the identifier i is attached for the sake of simplicity, and the processing of one cylinder alone is described. In Step S060, a check is made as to whether or not the ignition energization flag has been set. If this flag has not been set (NO), the ignition energization signal is stopped in Step S065.

On the other hand, if the flag has been set (YES), a check is made in Step S061 as to whether or not the target ignition timing has arrived. If the target ignition timing has not arrived (NO), a check is made in Step S062 as to whether or not the energization start timing has arrived. If the energization start timing has arrived in Step S062 (YES), an ignition signal is outputted in Step S063. Meanwhile, in the case of the target ignition timing in Step S061 (YES), the ignition energization flag is reset in Step S064. Subsequently, the ignition energization signal is stopped in Step 3065.

This series of routines control controls the output of the ignition signal through timer management. Consequently, the management of the ignition energization time is effected by the timer incorporated in the CPU to reliably perform the correction processing of the ignition energization time calculated as described above.

As described above, by making use of the timer function provided in the CPU, even if there has occurred a sudden change in the engine speed, it is possible to secure appropriate ignition energization time. Hence, there are advantages in that the possibility of misfire can be eliminated, and it is possible to suppress heat generation in the ignition circuit.

Second Embodiment

Next, a description will be given of a second embodiment of the invention. The difference with the first embodiment of the invention lies in the method in which correction is made for each crank angle signal. In the first embodiment, only the change in the crank angle average period is adjusted, and the computed ignition start angle is used as it is. However, since a sudden change in the engine speed has occurred, there is a time lag between the point of time when the computation is made and the point of time when the actual ignition signal is outputted. Hence, there is a possibility that the computation deviates. Accordingly, computing is performed again in accordance with Formula (5) or (6). In this case, recomputing cannot be effected unless the CPU has high processing capability or there is leeway in the processing time. Although there is no problem in the recalculation with the CPU having high processing capability, in the case of the CPU not having very high processing capability, if the recalculation is made, for instance, not at the crank angle immediately before the ignition start but at a crank angle preceding it, at which there is leeway in the processing time, and at a crank angle for which various computations are not being effected, it is unnecessary to pay heed to the processing time.

If the fourth stroke in the first embodiment is taken as an example, in the case of the ignition start timing, it means that are calculation is made at B65° CA. In this case, correction is made by the crank angle average period with respect to B65° CA 180° before. If it is assumed from FIGS. 5A and 5B that the crank angle period at B65° CA is 1.15 ms equivalent to B75° CA, we have (75−63.4)/10*1.5=1.74 ms (65−63.4)/10*1.15=0.18 ms The ignition start timer resets 0.18 ms from 1.74 ms. Consequently, a correction value which further incorporates the engine fluctuation comes to be used, so that more appropriate ignition timing correction becomes possible.

Figure 9:
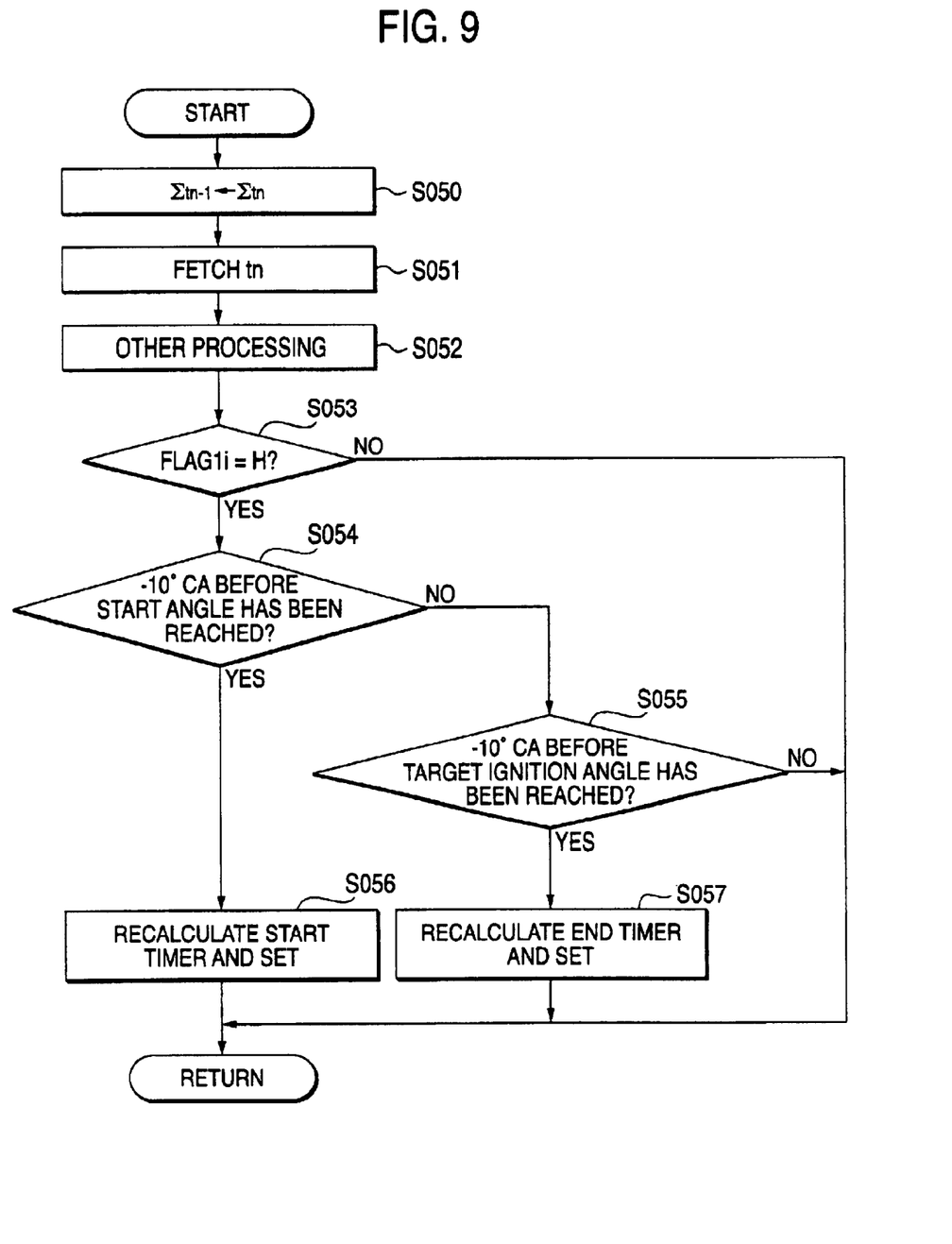
FIG. 9 is a flow chart in accordance with the second embodiment.

A further description will be given of this method with reference to FIG. 9 which shows the crank angle interrupt processing by the CPU. Since Steps S050 to S053 are identical to those of the first embodiment, a description will be given starting with Step S053.

In Step S053, a check is made as to whether or not the ignition signal has been set. In the case of the four-cylinder vehicle, it is necessary to make a check for each cylinder, and equivalent processing is effected four times. Here, the identifier i is attached for the sake of simplicity, and the processing of one cylinder alone is described. If the flag has not been set (NO), this routine ends. If it has been set (YES), a check is made in Step S054 as to whether the crank angle is 10° CA prior to the energization start angle which has been set. If the crank angle is the one before 10° CA (YES), a calculation is made again for the timer in Step S056, and the time remaining until the ignition signal output is corrected, and the timer is reset.

If the crank angle is not the one immediately before the energization start angle (NO) in step S054, a check is similarly made in Step S055 as to whether or not the crank angle is the one 10° CA before the target ignition angle. If the crank angle is not the one immediately before (NO), this routine ends. On the other hand, if the crank angle is the one immediately before (YES), the recalculation of the timer is made in Step S057 in the same way as the above-described energization start angle, and the timer is reset.

The method of this resetting will be described by taking the above-described-fourth stroke as an example. Since the energization start angle is 63.4°, the 10° CA crank angle close to that crank angle becomes B65° CA. Accordingly, this processing is effected in the case where the crank angle is B65° CA. In addition, the input time of the B65° CA signal has been stored in the above-described Step S050, and the crank angle average period before that has also been clarified. Accordingly, the timing when B63.4° CA arrives can be estimated from this latest data. In other words, the operation is such that the energization start timing, which was calculated and set 180° CA before, is corrected by the last crank angle signal by incorporating the fluctuations of the engine speed in the meantime. As described above, in terms of a specific numerical value, the timer value set in FIG. 6 was 1.74 ms, but at B65° CA detected this time, the engine speed has further changed and becomes 0.18 ms. Since the engine speed is thus changing, more appropriate energization is achieved by making the readjustment. This is also the correction of the correction term 20° CA. In addition, such readjustment can be made since the timer value set in FIG. 6 has been computed and set for the cylinder to be detected next time.

As for the target ignition time as well, if a specific numerical value is similarly used, (75−10)/10*1.5=9.75 ms (15−10)/10*1.15=0.57 ms The timer value set in FIG. 6 was 9.75 ms. In the recalculation made this time, the engine speed is detected to have further changed, so that review is made at the point of time of B15° CA before 10° CA. As a result, 0.57 ms is thus set for correction.

Third Embodiment

Next, a description will be given of a third embodiment. The difference with the first embodiment of the invention lies in the method in which the actual ignition signal is outputted after the computation of the ignition energization angle. If the example of FIGS. 5A and 5B in the first embodiment of the invention and the above-described results of computation are referred to, in the fourth stroke the ignition signal was outputted from B63.4° CA till B10° CA. However, in a case where timer processing by the CPU in the ECU 40 is troublesome, a crank angle close to it is used for the sake of simplification. In other words, all the processing is executed in synchronism with the crank angle signal.

Fourth stroke: $Dn=(65-5)*1.15/10=6.9$ ms

For the fourth stroke, the ignition energization time is secured by using B65° CA to B05° CA. Since the crank angle is in 10° CA periods, in a case where the crank angle became 5° CA which is substantially the center in calculation, the crank angle which gives a longer duration of ignition energization can be used by a method in which selection is made after making a determination as to whether or not the target ignition timing is closer to an ideal state, or a method in which a rounded-up value is used for the ignition energization start to simplify the processing. Alternatively, it is possible to adopt a method in which the value is rounded up in the case of the upward trend of the engine speed, and is rounded down in the case of the downward trend. In the fourth stroke of this example, control is provided such that ignition energization is started at B65° CA, and is stopped at B05° CA.

Next, a description will be given of correcting the ignition energization time in the crank angle synchronization system with reference to the operation of the CPU in the ECU 40. It should be noted that a description will be made with reference to FIG. 6 in the first embodiment. Since equivalent processing is effected in Steps S001 to S005, a description thereof will be omitted.

In Step S006, the case is the one in which there has been no sudden change in the engine speed, so that a normal ignition start angle, e.g., B45° CA, and a target ignition angle B15° CA are set. In Step S007, the case is the one in which there has been a sudden change, the ignition start angle B65° CA determined from the above formula and the target ignition angle B05° CA are set. It should be noted that it is unnecessary to effect the setting of the timer in the manner adopted in the first embodiment.

In Step S008, a flag is set which represents that the ignition start and target angles for the relevant cylinder have been set. Since this setting is also effected for each cylinder, the cylinder identifier i is attached, as described above.

Figure 10:
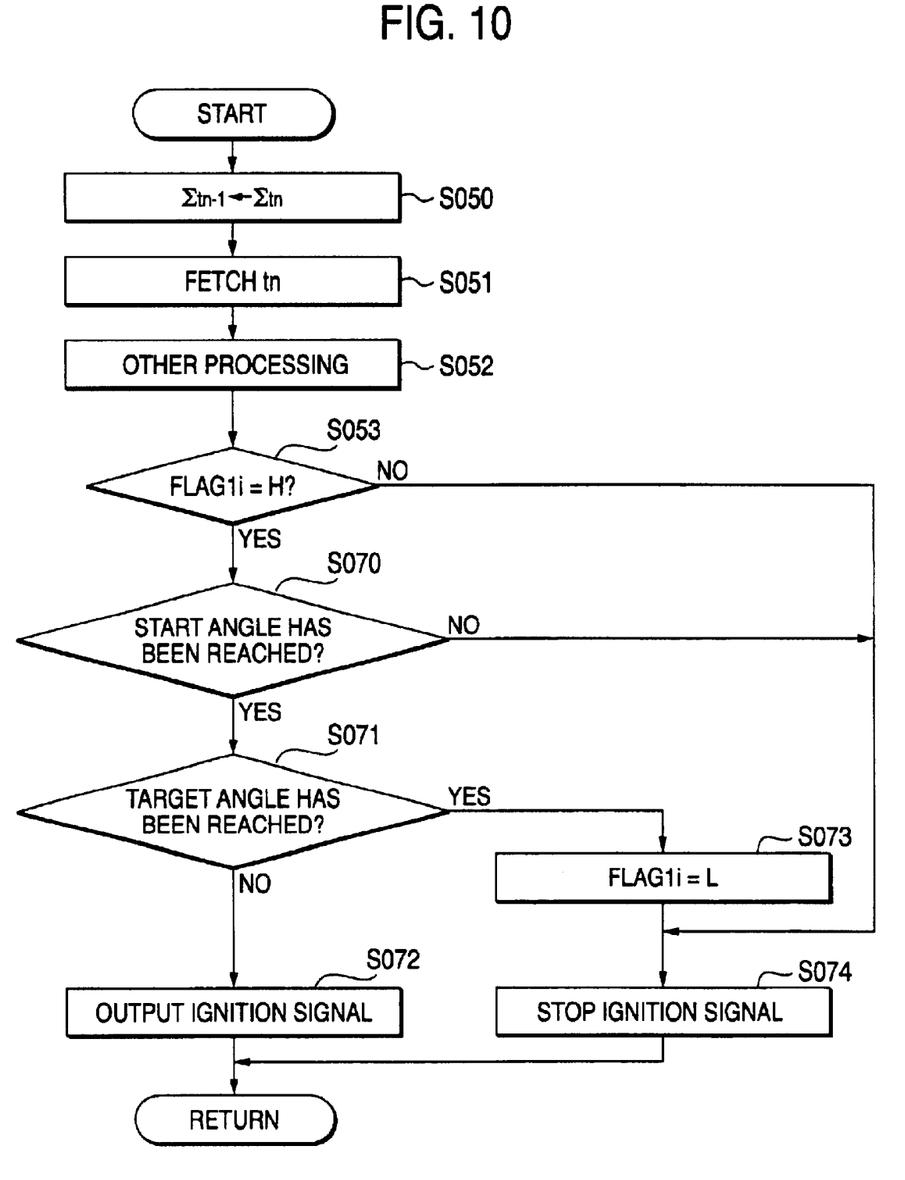
FIG. 10 is a flow chart in accordance with the third embodiment.

Next, referring to FIG. 10, a description will be given of the crank angle interrupt processing. Steps S050 to S052 of this processing are equivalent to those of FIG. 7. In Step S053, a check is made as to whether or not the ignition energization angle has been set. Although processing is subsequently effected for each cylinder, the cylinder identifier i will be used instead for the sake of simplification, and a description will be given of one cylinder.

If the flag has not been set (NO), the ignition signal is stopped (turned off) in Step S074. On the other hand, if the flag has been set (YES), since there is a possibility of outputting the ignition signal, the operation proceeds to Step S070. In Step S070, a check is made as to whether or not the present crank angle has reached the ignition start angle. If it has not reached the ignition start angle (NO), the ignition signal is not yet outputted in Step S074.

If the present crank angle has reached the ignition start angle (YES), a check is made in Step S071 as to whether or not the target ignition angle has been reached. If the target ignition angle has not been reached (NO), the ignition signal is outputted (turned on) in Step 3072. If the target ignition angle has been reached in Step S071 (YES), in Step S073 the ignition signal is stopped after resetting the flag to stop the ignition energization.

After effecting the above-described processing for each cylinder, the operation returns to the main program. Consequently, it becomes possible to control the ignition signal for each input of the crank angle signal. By synchronizing the ignition signal with the crank angle signal, control of the ignition signal is made easy. Even if the engine speed undergoes a sudden change, the ignition energization time does not become short, so that there is an advantage in that the possibility of misfire is eliminated. In addition, if the ignition energization is effected for a long duration from the outset to allow a sudden change in the engine to be coped with when it has occurred, this results in not only a waste of electric power, but a drawback occurs in that a measure against heat generation of the ignition circuit is required. Therefore, simple and appropriate ignition energization time can be secured.

In addition, in the same way as the first embodiment, it is also possible to make a check as to whether or not the energization start angle which has been set at the crank angle for each 10° until the arrival of the energization start angle needs to be corrected due to fluctuations in the engine speed. If a change is required, resetting may be effected.

Since the ignition controller of the invention is arranged as described above, the following advantages are offered.

According to the ignition controller of the invention, there are provided an engine-speed detecting unit for detecting a change in an engine speed of the internal combustion engine and an ignition correcting unit for correcting ignition energization time, an ignition energization start timing, and an ignition timing in correspondence a changed engine speed in a case where the change in the engine speed is equal to a greater than a predetermined level. Accordingly, an advantage is offered in that even if a sudden change has occurred in the engine speed of the internal combustion engine, appropriate ignition start and ignition timing control is possible.

In addition, according to the ignition controller of the invention, the ignition correcting unit corrects again one of the once-corrected ignition energization start timing and ignition timing at the time of inputting of the crank angle signal prior to effecting that ignition control. Therefore, an advantage is offered in that even if a sudden change has occurred in the engine speed of the internal combustion engine, appropriate ignition start and ignition timing control is possible.

In addition, according to the ignition controller of the invention, the ignition correcting unit is able to synchronize the corrected ignition energization start timing and ignition timing with a crank angle signal immediately close thereto. Accordingly, there is an advantage in that more appropriate ignition start and ignition timing control is possible in a simple manner.

What is claimed is:

1. An ignition controller for an internal combustion engine comprising:
    a crank angle sensor for generating a plurality of crank angle signals periodically in correspondence with a rotational angle of a crankshaft of an internal combustion engine;

a cam sensor for generating cylinder discrimination information of said internal combustion engine in correspondence with a rotational angle of a camshaft rotating in synchronism with said crankshaft; and a control unit for controlling the ignition energization of each cylinder of said internal combustion engine on the basis of said crank angle signals and said cylinder information, wherein said control unit includes:

an engine-speed detecting unit for detecting a change in an engine speed of said internal combustion engine; and an ignition correcting unit for correcting ignition energization time, an ignition energization start timing, and an ignition timing in correspondence a changed engine speed in a case where the change in the engine speed is equal to a greater than a predetermined level.

2. The ignition controller for an internal combustion engine according to claim 1, wherein said control unit includes:

an engine-speed detecting unit for detecting a change in the engine speed of the internal combustion engine on the basis of an average period of a crank angle; and an ignition correcting unit for computing an ignition energization start on the basis of a change in the crank angle average period to correct the ignition energization time in a case where the change in the engine speed has been detected.

3. The ignition controller for an internal combustion engine according to claim 1, wherein said ignition correcting unit effects correction on the basis of an ensuing estimated crank angle average period or effects correction by adding or subtracting a predetermined amount to or from a present crank angle average period.

4. The ignition controller for an internal combustion engine according to claim 1, wherein said ignition correcting unit corrects again one of the once-corrected ignition energization start timing and ignition timing at the time of inputting of the crank angle signal prior to effecting that ignition control.

5. The ignition controller for an internal combustion engine according claim 1, wherein said ignition correcting unit synchronizes the corrected ignition energization start timing and ignition timing with a crank angle signal immediately close thereto.

* * * * *